United States Patent Office  3,634,369
Patented Jan. 11, 1972

3,634,369
VINYLIDENE CHLORIDE POLYMERS OF BROADENED MOLECULAR WEIGHT DISTRIBUTION
Richard F. Baumann, Midland, Mich., assignor to The Dow Chemical Company, Midland, Mich.
No Drawing. Filed Apr. 9, 1970, Ser. No. 27,133
Int. Cl. C08f 15/08
U.S. Cl. 260—80.77
7 Claims

ABSTRACT OF THE DISCLOSURE

This invention is directed to vinylidine chloride polymers of broadened molecular weight distribution and to a process for preparing the same comprising polymerizing the monomeric materials in the presence of from about 0.01 to about 1 weight percent, based on monomer weight, of a coupling agent of the general formula:

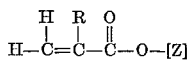

wherein R is hydrogen or methyl and Z is allyl or alkylene acrylate or methacrylate wherein the alkylene group contains from 2 to 12 carbon atoms.

BACKGROUND OF THE INVENTION

Vinylidene chloride polymers, and copolymers of vinylidene chloride with another coplymerizable monomer such as vinyl chloride, have been fabricated into a wide variety of useful articles. One of the most common methods of fabricating such articles is to melt the polymer and express it through a suitably shaped die orifice. The ease with which the molten polymer may be forced through the die orifice is dependent upon the flow viscosity of the molten polymer. In general, the lower the flow viscosity for a given polymer the easier it will be to force it through the die orifice. For linear polymers the flow viscosity is directly related to molecular weight. It is likewise true that for linear polymers the physical properties of articles produced from the polymer are related to and dependent upon the molecular weight of the polymer. For example, the tensile strength of a film or filament prepared from a linear polymer will usually be greater with high molecular weight polymers than with a low molecular weight polymers. Consequently, a compromise must be found as to the optimum molecular weight desired. As a further complication the molecular weight of a linear polymer is dependent upon the particular polymerization conditions under which it is made. Thus, the polymerization conditions which are the most economically favorable will not always provide a polymer with the optimum molecular weight for fabrication.

This disadvantage may be overcome by producing polymers having broadened molecular weight distributions.

The molecular weight distribution (MWD) ratio for vinylidene and related monomers may be defined as the weight average molecular weight ($\overline{M}w$) divided by the number average molecular weight ($\overline{M}n$). The rate at which one average increases with respect to the other determines whether the distribution ratio ($\overline{M}w/\overline{M}n$) will increase, decrease or stay constant as the conversion of monomer to polymer increases during the polymerization reaction.

The provision of a process for broadening the molecular weight distribution of vinylidene chloride polymers without appreciably lowering the rate of polymerization is the principal object of the present invention.

SUMMARY OF THE INVENTION

The above and related objects are accomplished by means of a process wherein the monomeric ingredients of the vinylidene chloride polymer are polymerized in the presence of from about 0.1 to 1, preferably from about 0.1 to 0.3 weight percent, based on the monomer weight, of a coupling agent having the general formula:

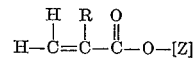

wherein R is hydrogen or methyl and Z is allyl or alkylene acrylate or methacrylate wherein the alkylene group contains from 2 to 12 carbon atoms. Exemplary of preferred materials are the diacrylates and dimethacrylates of ethylene, 1,3-propylene, 1,4-butylene, iso-butylene, 1,6-hexylene, tetraethylene, 1,10-decylene and 1,2-dodecylene and allyl acrylate and methacrylate.

Any of the known methods of polymerization may be employed, e.g. mass, aqueous emulsion, aqueous suspension, or solution, although especially advantageous results are obtained when the common non-emulsified aqueous suspension method is used. In such method a water-dispersible granulating agent is usually employed and the effectiveness of that agent varies with the oil-soluble catalysts having a relatively narrow temperature range of catalytic effectiveness.

Catalysts which may be employed, however, include any conventional polymerization initiator such as the peroxygen and azo-type catalysts. Examples of peroxygen catalysts are inorganic peroxides, e.g. hydrogen peroxide and persalts, such as alkali persulfates, alkali borates, alkali and alkyl percarbonates; and organic peroxides, e.g. diacetyl peroxide, dibenzoyl peroxide, acetyl benzoyl peroxide, acetyl cyclohexyl sulfonyl peroxide, lauroyl peroxide, and the like. Examples of azo catalysts are alpha, alpha' azobisisobutyronitrile and the like. Catalytic amounts, generally from about 0.05 percent to about 2 percent based on monomer may be used. Particularly good results are often obtained by adding the catalyst, especially isopropyl percarbonate, throughout the course of the polymerization reaction either by shot-wise or continuous addition techniques.

The coupling agent may be added to the polymerization charge in any manner, although when polymerizing in an aqueous medium it may be preferred to add it to the monomer before dispersing the monomer in the aqueous phase. In this way the coupling agent will be evenly distributed throughout the monomer droplets.

The coupling agents as defined herein are effective for broadening the molecular weight of all vinylidene chloride polymers and are particularly effective with polymers comprising at least about 70 percent vinylidene chloride with any remainder being at least one other ethylenically unsaturated comonomer.

The process of the present invention is especially well adapted for preparing copolymers of from about 70 to 95 weight percent vinylidene chloride with the remainder being vinyl chloride, which copolymers may be easily fabricated into oriented blown films characterized by having a shrink capability of from about 40 to 60 percent and having high clarity and gloss. Such polymers generally are characterized by having a molecular weight distribution defined as weight average molecular weight divided by number average molecular weight of less than about 2.

In the following examples, which illustrate the present invention, the number average molecular weight ($\overline{M}n$) and weight average molecular weight ($\overline{M}w$) were determined by preparing a 0.5 or 1 percent solution of vinylidene chloride polymer in tetrahydrofuran. This solution was then injected into a Waters gel permeation chromatograph using six packed columns for the separation process.

The detection device is a differential refractometer, i.e. the quantity being measured is the difference between the index of the sample solution and the pure solvent. Calculatoin procedures recommended by Waters were used and calibration standards were run to establish the molecular weight-eluent count curve. The peak height in such curve is assumed to be directly proportional to the amount of polymer of a certain molecular weight present at any given point on the curve. This is used to calculate the weight and number average molecular weights. The normalized peak height and cumulative percent were also calculated. Normalized peak height is a means of comparing distribution curves on a common basis. Essentially, it amounts to normalizing on the basis of equal quantities of polymer. The molecular weight distribution ratio, $\overline{M}w/\overline{M}n$, is used as a measure of the broadness of the distribution.

EXAMPLE 1

In each of a series of experiments, to a 20 gallon Pfaudler kettle equipped with a finger baffle and a crow foot agitator and containing 5 pounds of water was added 76.5 grams of the catalyst isopropyl percarbonate (as a 20 percent solution in acetyl tributyl citrate) along with 49.25 pounds of vinylidene chloride and 18.25 pounds of vinyl chloride and varying amounts and types of a coupling agent. This mixture was agitated for 15 minutes followed by the addition of 115.7 pounds of an aqueous solution of 2.7 pounds of a hydroxypropyl methylcellulose having a viscosity of 4000 cps. The admixture was then heated to 52° C. and the reaction maintained at this temperature for a period of 8 hours after which an additional 153 grams of the catalyst was added. The polymerization was then continued for an additional 10 hours during which time the jacket temperature of the kettle approached 50° C. wherein an additional 76.5 grams of catalyst was added and the polymerization continued to a 2 pound pressure drop. The kettle was then vented and evacuated and the polymer recovered, and the percent conversion determined.

The number ($\overline{M}n$) and weight ($\overline{M}w$) average molecular weights were determined according to the gel permeation chromatograph technique described supra with the molecular weight distribution (MWD) defined as $\overline{M}w/\overline{M}n$. The following Table I sets forth the type and amounts of coupling agent used as well as the number and weight average molecular weight, the molecular weight distribution and the percent yield of the polymer.

TABLE I

| Exp. No. | Coupling agent Type | Amount (percent BOM) | $\overline{M}w$ | $\overline{M}n$ | MWD | Percent yield |
|---|---|---|---|---|---|---|
| 1 | None | None | 66,898 | 37,979 | 1.76 | 88–93 |
| 2 | 1,4-butylene glycol diacrylate | 0.1 | 141,870 | 45,710 | 3.10 | 88–93 |
| 3 | Tetraethylene glycol diacrylate | 0.1 | 104,951 | 42,668 | 2.46 | 88–93 |
| 4 | Allyl methacrylate | 0.1 | 96,767 | 40,549 | 2.39 | 88–93 |

The above data illustrate the unexpected ability of the coupling agents contemplated for use by the present invention to broaden the molecular weight distribution of vinylidene chloride polymers. It has further been found that concentrations of such coupling agents of less than about 0.1 weight percent are not effective for accomplishing the purposes of the present invention, and that concentrations exceeding about 1 weight percent produce significant amounts of undesirable polymer gels.

EXAMPLE 2

The polymer blend designated as Experiment No. 2 of Table I was thermally extruded using standard bubble techniques into oriented film having a thickness of about 0.002 of an inch and the tensile strength of such film determined using ASTM Test No. D-638 and D-651. This film was compared with a film sample prepared in the same manner but without the coupling agent.

The following Table II sets forth the composition of the individual film samples, their respective tensile strength values and visual ratings as to film clarity and gloss.

TABLE II

| | | Film properties | |
|---|---|---|---|
| Exp. No. | Coupling agent | Tensile strength (p.s.i.) | Clarity and gloss |
| 5 | None | 6,420 | Excellent. |
| 6 | 0.1% 1,4-butylene glycol diacrylate | 8,510 | Do. |

The above data illustrate the significant enhancement in tensile strength properties inherent in the vinylidene chloride polymers having broadened molecular weight, i.e. a molecular weight distribution of greater than 2, prepared in accordance with the present invention.

What is claimed is:

1. A process for broadening the molecular weight distribution of a vinylidene chloride polymer containing between about 70 and 95 weight percent vinylidene chloride with the remainder being at least one other ethylenically unsaturated comonomer comprising polymerizing the monomeric ingredients in the presence of from about 0.01 to about 1 weight percent based on monomer of at least one coupling agent of the general formula:

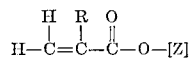

wherein R is hydrogen or methyl and Z is allyl.

2. The process of claim 1 wherein said comonomer is vinyl chloride.

3. The process of claim 2 wherein said vinylidene chloride polymer is a copolymer of about 73 weight percent vinylidene chloride and about 27 weight percent vinyl chloride.

4. The process of claim 3 wherein said coupling agent is allyl methacrylate.

5. A copolymer of from about 70 to 95 weight percent vinylidene chloride and from about 5 to 30 weight percent vinyl chloride, said copolymer containing from about 0.01 to 1 weight percent of at least one coupling agent of the general formula:

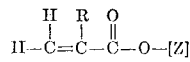

wherein R is hydrogen or methyl and Z is allyl and wherein said copolymer has a molecular weight distribution defined as weight average molecular weight divided by number average molecular weight of greater than about 2.

6. The copolymer of claim 5 containing about 73 weight percent vinylidene chloride and about 27 weight percent vinyl chloride.

7. The copolymer of claim 5 wherein said coupling agent is allyl methacrylate.

References Cited

UNITED STATES PATENTS 3,317,450   5/1967   Grenley et al. _____ 260—29.7
3,317,449   5/1967   Isaacs et al. _____ 260—29.6

JOSEPH L. SCHOFER, Primary Examiner

J. KIGHT III, Assistant Examiner

U.S. Cl. X.R.

260—78.5 cl, 80.81, 86.3, 87.7